July 3, 1945.  G. W. PLUMB  2,379,593
SPRING NUT WITH LOCKING SPUR
Filed Oct. 31, 1944
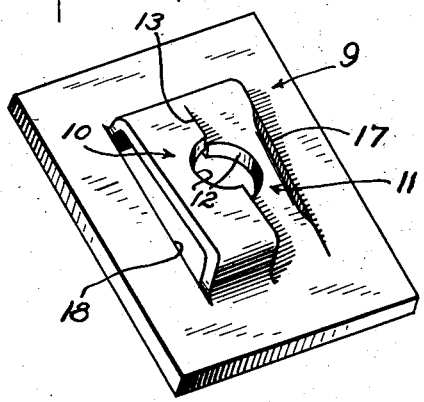
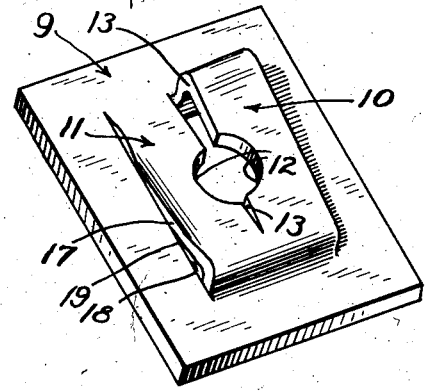
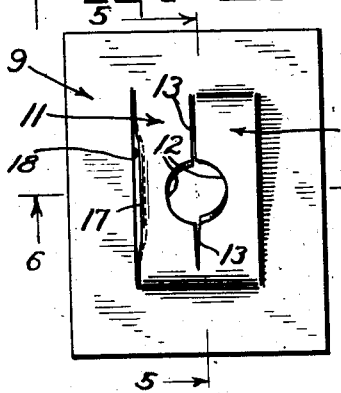
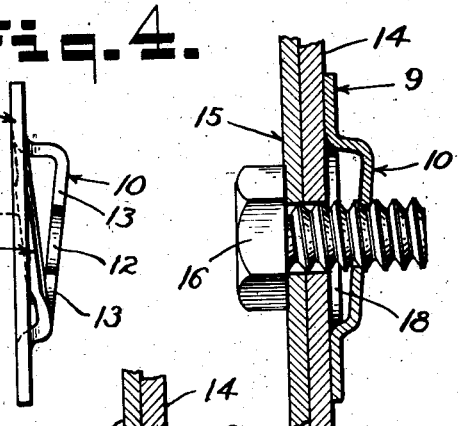
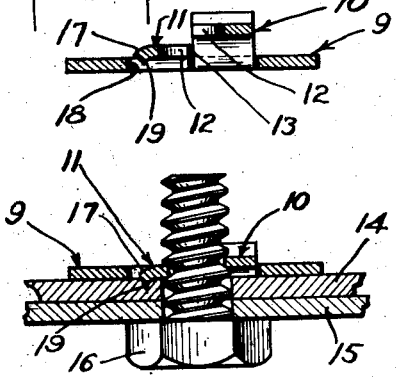
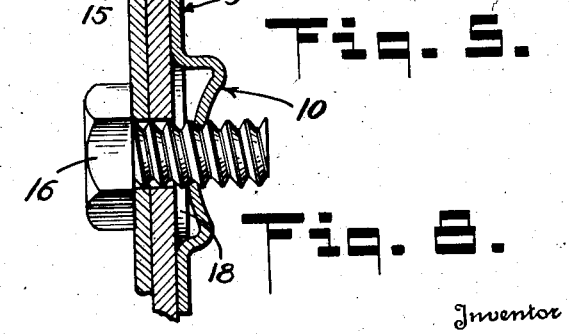
Inventor
GEORGE W. PLUMB
By R. S. Berry
Attorney Patented July 3, 1945

2,379,593

UNITED STATES PATENT OFFICE 2,379,593

SPRING NUT WITH LOCKING SPUR

George W. Plumb, Los Angeles, Calif., assignor to Adel Precision Products Corp., a corporation of California Application October 31, 1944, Serial No. 561,222

7 Claims. (Cl. 151—21)

This invention relates to spring nuts of the type in which a sheet metal body is provided with outwardly offset resilient portions between opposed side edges of which a bolt may be turned in order to have screw threaded engagement therewith and cause such portions to be flexed and bowed to tightly grip and bite into the bolt under spring tension, thereby "locking" the nut in place.

An object of the present invention is to provide a spring nut of the character described in which novel locking projection or spur is arranged in a simple manner without adding material or appreciably increasing the cost of the manufacture of the nut, so as to automatically bite into the object against which the nut abuts to prevent turning of the nut relative to said object, thereby producing a locking action in addition to that afforded when the offset portions of the nut threadedly engage the bolt under spring tension as aforesaid.

With the foregoing object in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a nut embodying my invention;

Fig. 2 is a perspective view of the nut turned through 180 degrees from the position shown in Fig. 2;

Fig. 3 is a top plan view of the nut as shown in Fig. 2;

Fig. 4 is a side elevation of the nut;

Fig. 5 is a vertical sectional view taken on the line 5—5 of Fig. 3 showing the nut installed;

Fig. 6 is a cross sectional view taken on the line 6—6 of Fig. 3;

Fig. 7 is a cross sectional view corresponding to Fig. 6 showing the nut applied and the manner in which it locks on the bolt and against the object on which it rests when the bolt is tightened;

Fig. 8 is a sectional view corresponding to Fig. 5 showing a portion of the nut as it would appear after tightening of the bolt therein.

Referring more specifically to the drawing, it is seen that one embodiment of my invention includes an elongated plate-like body portion 9 preferably made of resilient sheet metal and formed with oppositely inclined, outwardly struck and elongated arch or bridge portions 10 and 11 which lie side by side.

A bolt receiving opening is defined between the opposed longitudinal edges of the bridge or arch portions 10 and 11 by means of complementary arcuate edge portions 12, separated by a longitudinal cut or slit 13 formed in striking the portions 10 and 11 to lie in outwardly offset relation to the remainder of the body portion 7. This remainder of the body portion forms a rectangular frame which is adapted to rest on one of the two members 14 and 15 which are secured by the nut hereof and a bolt 16 as shown in Figs. 4, 7 and 8.

In nuts of this type the arch portion 10 is of greater outward extent that the arch portion 11 and this relative arrangement together with the opposite inclination of such arch portions, disposes the arcuate edges 12 at such relative angles and positions as to provide for a threaded engagement thereof under spring tension with the bolt, thereby locking the nut on the bolt so that accidental loosening of the bolt will be prevented.

In accordance with the present invention I provide on one of the bridge portions 10 and 11 a locking projection or spur 17 as a readily formed integral part thereof, for example, on the bridge portion 11 which is subject to being more readily forced into contact with the member to which the nut is applied as shown in Fig. 7. This locking spur or projection is formed by bending a portion of the outer longitudinal edge of the arch portion 11 inwardly to extend into the opening 18 in the body portion which opening is formed in striking the portion 11 outwardly therefrom. Thus by the simple expedient of bending a part of the outer side edge of arch portion 11 inwardly for a considerable part of the length of said edge, the locking spur 17 is provided.

As shown in Fig. 6 the spur 17 is normally disposed in outwardly spaced relation to the plane of the surface of the body portion which is adapted to rest on the member to which the nut is applied. However, when the bolt is tightened the sharp edge 19 of the spur 17 will be forced against and bite into the member against which the nut bears as shown in Fig. 7 so as to lock the nut as a whole against turning relative to said member and the bolt. This locking action, together with that afforded by the inward flexing of the bridge portions 10 and 11 against the bolt, assures a positive locking of the nut against loosening on the bolt as well as prevents the turning of the bolt and nut as a unit, once the bolt is tightened as shown in Figs. 6 and 7.

Moreover, the spur 17, after a few turns of the bolt, will contact the member against which the the nut bears, thereby preventing the turning of the nut during the tightening of the bolt.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a nut, a body portion, elongated resilient portions struck outwardly from the plane of said body portion and provided with opposed side edge portions defining an opening in which a screw threaded member may be turned so as to have tensioned screw threaded engagement with said side edge portions; and an inwardly turned side edge portion on one of said struck out portions forming a locking spur adapted to contact the member against which the nut is applied to prevent turning of the nut relative to said member.

2. In a nut, a body portion, elongated resilient portions struck outwardly from the plane of said body portion and provided with opposed side edge portions defining an opening in which a screw threaded member may be turned so as to have tensioned screw threaded engagement with said side edge portions; and an inwardly turned portion intermediate the ends of one of said outwardly struck portions forming a locking spur for engaging the member to which the nut is applied to prevent turning of the nut.

3. In a nut, a body portion, elongated resilient portions struck outwardly from the plane of said body portion and provided with opposed side edge portions defining an opening in which a screw threaded member may be turned so as to have tensioned screw threaded engagement with said side edge portions; and an integral elongated locking spur intermediate the ends of one of said outwardly struck portions arranged to engage the surface of the member to which the nut is applied when the screw threaded member is tightened.

4. In a nut, a body portion, elongated resilient portions struck outwardly from the plane of said body portion and provided with opposed side edge portions defining an opening in which a screw threaded member may be turned so as to have tensioned screw threaded engagement with said side edge portions; said outwardly struck portions being arranged to bow inwardly between their ends when the screw threaded member is tightened in the nut, one of said outwardly offset portions being arranged to be bowed into a position closer to the member to which the nut is applied than the other offset portion, and an integral locking spur intermediate the ends of said one outwardly struck portion arranged to engage said member to prevent the nut from turning when said one outwardly struck portion is bowed toward said member.

5. In a nut, a body portion, oppositely inclined outwardly offset elongated portions formed integral with said body portion and lying side by side with their inner edges spaced apart and provided with arcuate edge portions adapted to have tensioned and screw threaded engagement with a screw threaded member turned therebetween, and a longitudinal edge portion on one of said off-set portions arranged to engage the member to which the nut is applied to prevent turning of the nut relative thereto when the screw threaded member is tightened in the nut.

6. In a nut, a body portion, oppositely inclined outwardly offset elongated portions formed integral with said body portion and lying side by side with their inner edges spaced apart and provided with arcuate edge portions adapted to have tensioned and screw threaded engagement with a screw threaded member turned therebetween, and a longitudinal edge portion on one of said offset portions arranged to engage the member to which the nut is applied to prevent turning of the nut relative thereto when the screw threaded member is tightened in the nut, said longitudinal edge portion being located in spaced relation to the ends of said one outwardly struck portion.

7. In a nut, a body portion, oppositely inclined outwardly offset elongated portions formed integral with said body portion and lying side by side with their inner edges spaced apart and provided with arcuate edge portions adapted to have tensioned and screw threaded engagement with a screw threaded member turned therebetween, and a longitudinal edge portion on one of said offset portions arranged to engage the member to which the nut is applied to prevent turning of the nut relative thereto when the screw threaded member is tightened in the nut, said longitudinal edge portion being bent to extend angularly inwardly and presenting a sharp edge adapted to bite into said member under tension.

GEORGE W. PLUMB.